United States Patent [19]

Hagar

[11] 4,191,212
[45] Mar. 4, 1980

[54] MULTIPLE BLADE DAMPER ASSEMBLY

[75] Inventor: Donald K. Hagar, Allentown, Pa.

[73] Assignee: Damper Design, Inc., Allentown, Pa.

[21] Appl. No.: 798,166

[22] Filed: May 18, 1977

[51] Int. Cl.² .......................... F16K 1/22; F24F 13/16
[52] U.S. Cl. ............................. 137/601; 137/246.22
[58] Field of Search ........................... 137/246.22, 601

[56] References Cited

U.S. PATENT DOCUMENTS

| | | |
|---|---|---|
| 44,981 | 11/1864 | Smith . |
| 795,745 | 7/1905 | Williams . |
| 1,408,223 | 2/1922 | Randall et al. . |
| 2,148,713 | 2/1939 | Roof . |
| 3,017,899 | 1/1962 | Goldsmith . |
| 3,084,715 | 4/1963 | Scharres . |
| 3,353,551 | 11/1967 | Smale . |
| 3,443,558 | 5/1969 | Banko . |
| 3,525,328 | 8/1970 | Crudden . |
| 3,547,152 | 12/1970 | Hess . |
| 3,696,804 | 10/1972 | Paredes . |
| 3,749,115 | 7/1973 | Raftis ................................ 137/601 |
| 3,771,559 | 11/1973 | Alley ................................. 137/601 |
| 4,077,432 | 3/1978 | Herr ................................. 137/601 |

FOREIGN PATENT DOCUMENTS 697113  1/1951  United Kingdom .
1104759  7/1965  United Kingdom .

Primary Examiner—Allen M. Ostrager
Attorney, Agent, or Firm—Schwartz, Jeffery, Schwaab, Mack, Blumenthal & Koch

[57] ABSTRACT

A damper assembly including a plurality of damper blades pivotable about parallel axes. Each blade includes a pair of parallel plates spaced apart by supporting members, the plates providing an open fluid passageway through the blade. When the damper blades are in the closed condition, the passageways form a single enclosed space into which pressurized sealing air may be introduced to render the damper gastight with respect to gases in the main duct. In the open condition the damper blades offer very little flow resistance by allowing conduit gases to flow through the passageways between the plates of the blades.

19 Claims, 11 Drawing Figures

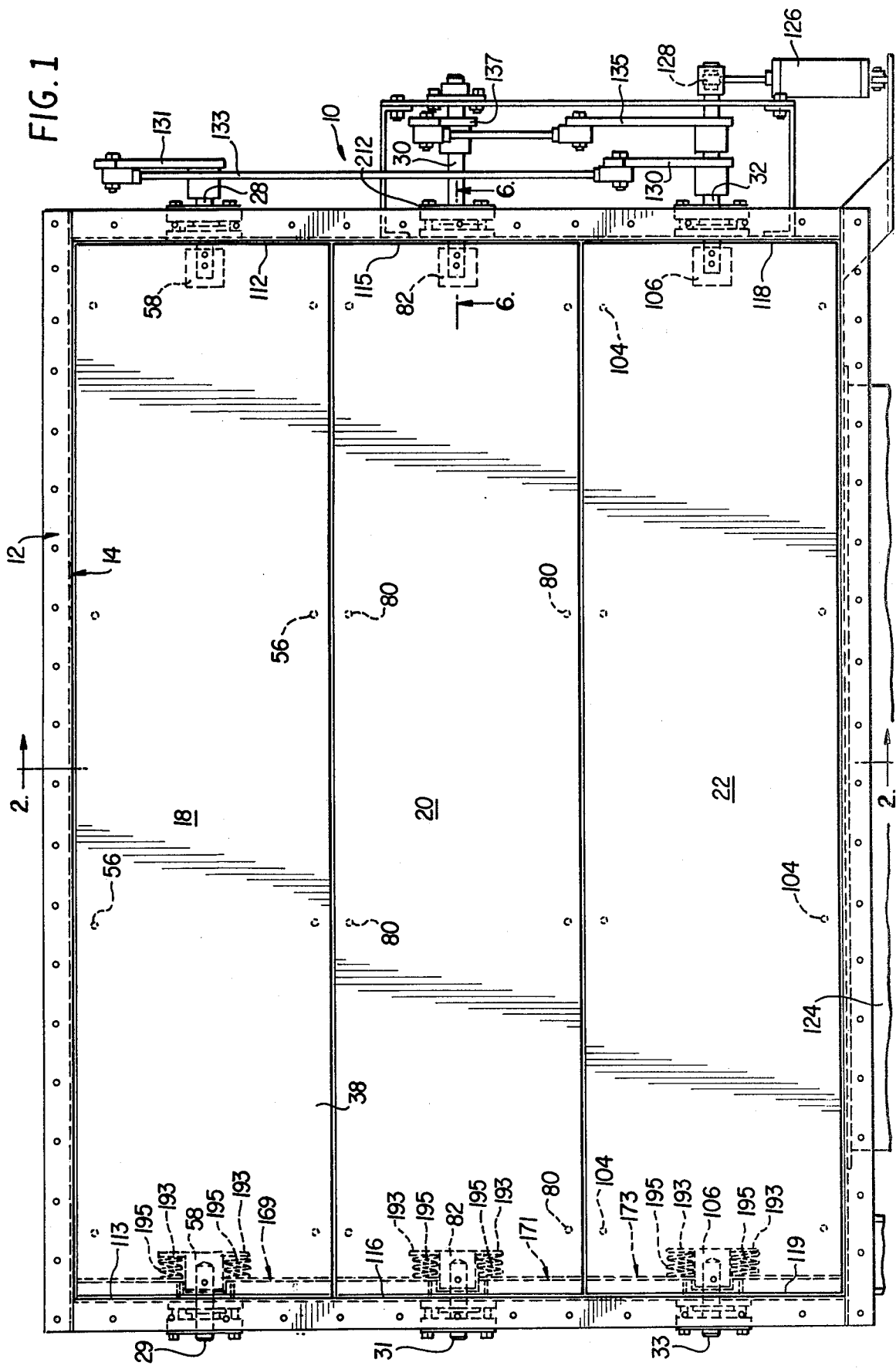

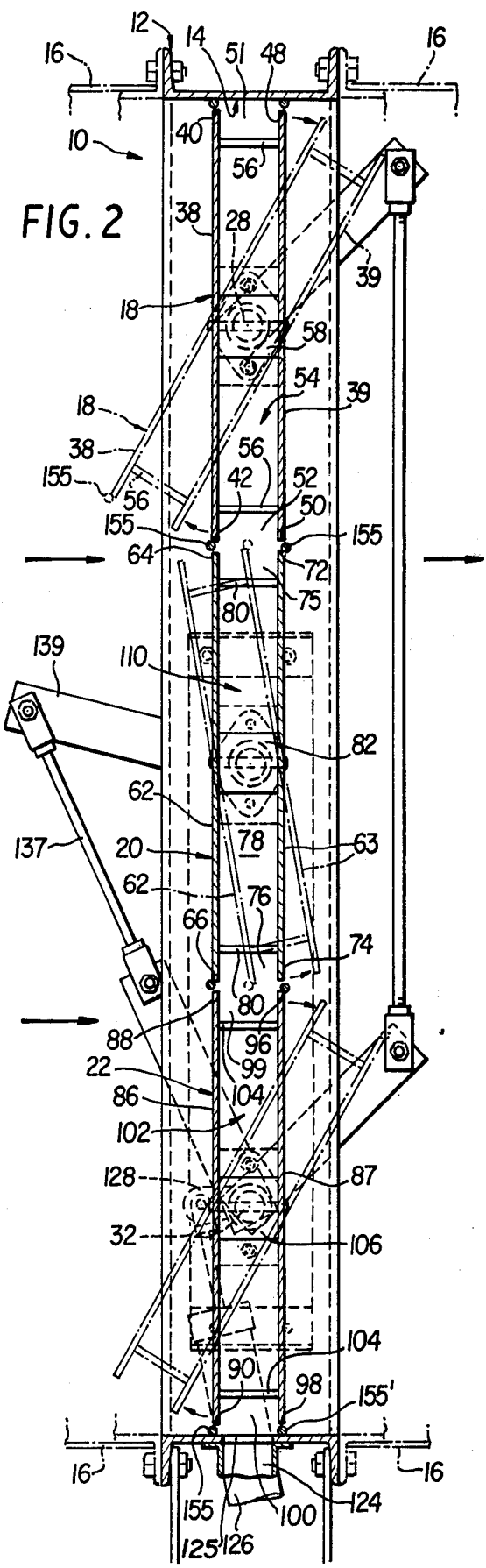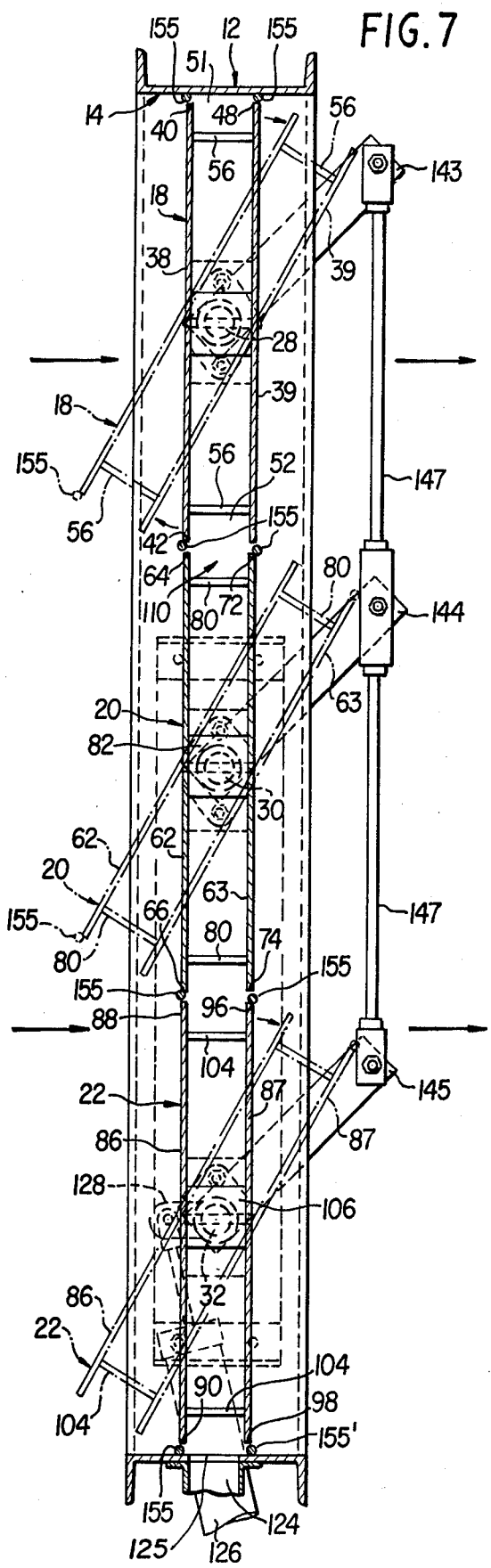

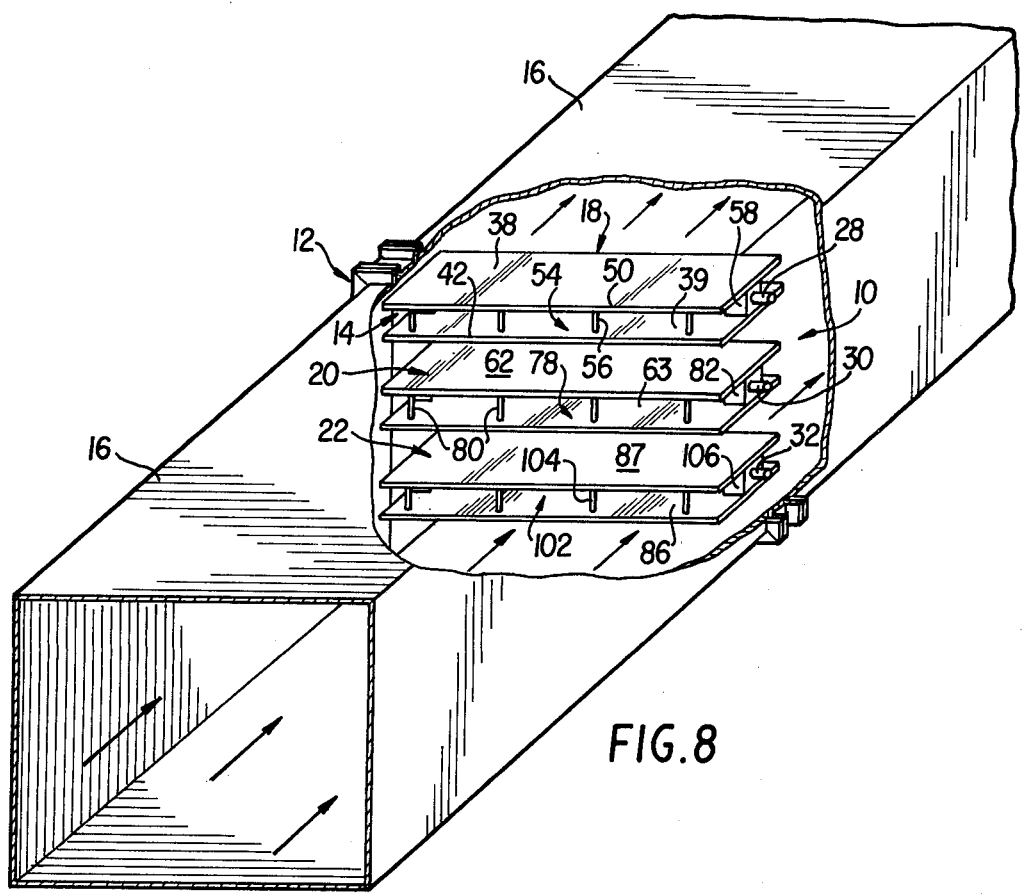

MULTIPLE BLADE DAMPER ASSEMBLY

BACKGROUND OF THE INVENTION

The present invention relates to a damper assembly for controlling the flow of a gas through a duct. More particularly, the invention relates to a type of damper including a plurality of elongated blades extending across the duct and rotatable from a closed position forming a barrier perpendicular to the flow to an open position wherein the blades are parallel to the flow. Such dampers are commonly referred to as louver dampers. A damper of this general type is shown in U.S. Pat. No. 3,525,328.

SUMMARY OF THE INVENTION

The general object of the present invention is to provide an improved damper assembly of the foregoing general type which is of particularly a simple and relatively inexpensive construction, which provides an aerodynamically advantageous blade configuration and which provides a construction amenable to gastight sealing with respect to duct gases. More specifically, the present invention provides a unique damper blade assembly wherein each blade includes a pair of parallel plates having an open space between them, the space providing a substantially unrestricted open passageway through each blade. When the blades are in the open position, gases in the conduit may flow through and around the blades, the thin plates providing an unusually low flow resistance. When the blades are moved into the closed position, the passageways of the blades become aligned with each other to form a single enclosed space. A pressurized sealing medium such as air may be introduced into the enclosed space to provide a pressure therein greater than the pressure head of the fluid in the gas carrying duct. The pressurized sealing air ensures a complete sealing off of the gas in the duct.

According to other aspects of the invention, bleeding or leakage of pressurized sealing air from the enclosed sealing space is controlled by maintaining predetermined clearances between certain movable elements. To this end, one side of each blade includes a spring-biased movable member having extremities which will remain at a fixed distance from the frame of the damper regardless of thermal expansion of the damper blades when exposed to high temperature gases in the duct. Also, mating edges or mating regions of the damper blades and frame extending parallel to the blade axes have controlled clearances provided by rigid, elongated members fixedly attached to one edge or region of each of the mating pairs of edges or regions.

Other objects, features and advantages of the invention will become apparent from the following detailed description taken in conjunction with the accompanying drawings.

BRIEF DESCRIPTION OF THE DRAWINGS

FIG. 1 is a front elevational view of the louver type damper of the present invention;

FIG. 2 is an enlarged fragmentary vertical sectional view, taken on the line 2—2 of FIG. 1 showing the blades of the damper assembly in the closed position and also showing, in phantom lines, a partially open position of the blades;

FIG. 7 is a fragmentary vertical sectional view, similar to FIG. 2, but showing a modification of the linkage for actuating the damper blades;

FIG. 8 is a perspective view, partially cut away, of the damper assembly of the present invention installed in a duct;

FIG. 9 is an enlarged, fragmentary, sectional view showing installation of an elongated, clearance establishing member in the region between cooperating edges of the plates of adjoining damper blades; and FIGS. 10 and 11 are enlarged, fragmentary sectional views similar to FIG. 9 but showing the completed installation of the elongated, clearance establishing member.

DETAILED DESCRIPTION

Figure 3:
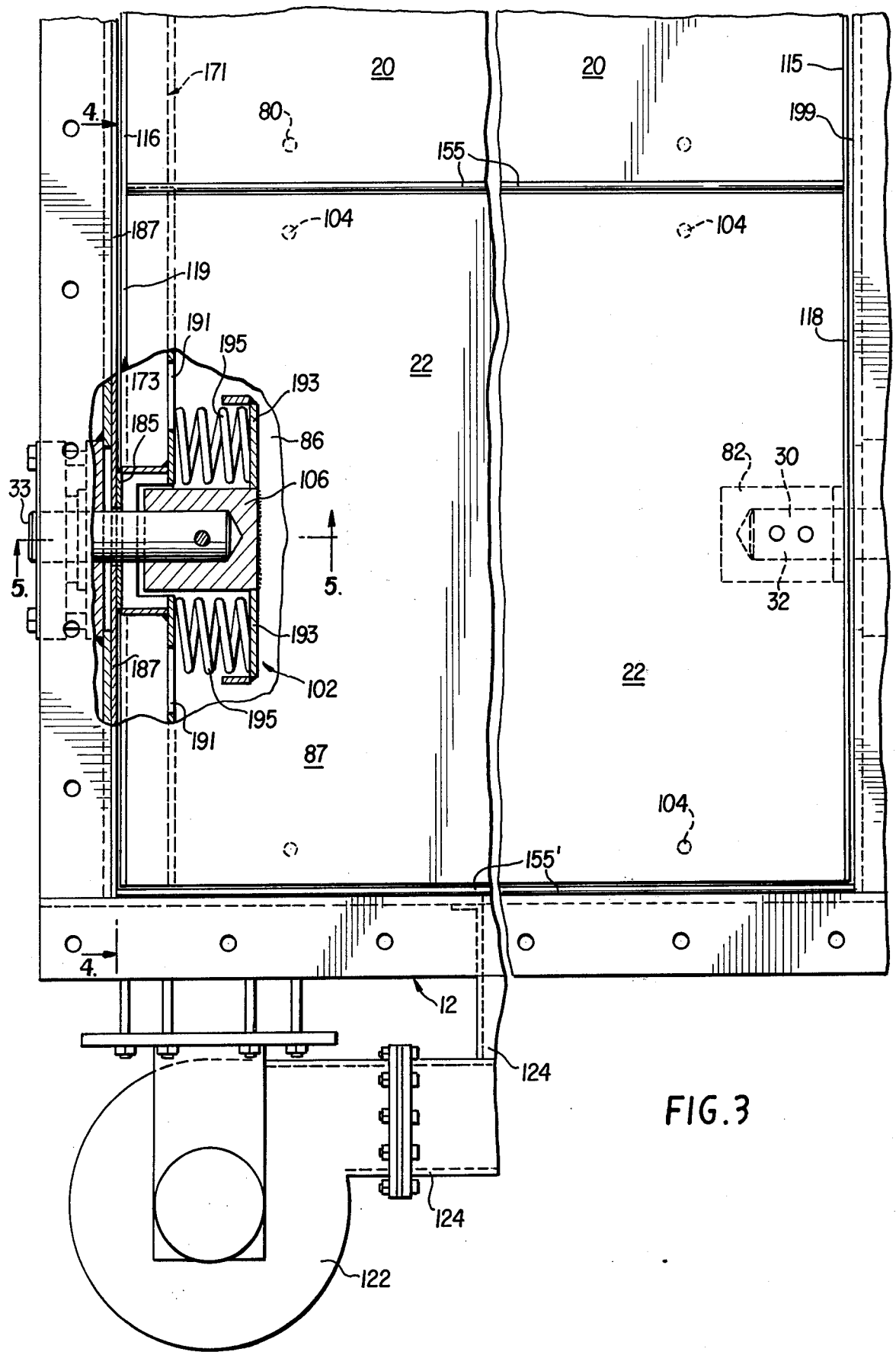
FIG. 3 is an enlarged fragmentary elevational view, partly in section, of a portion of the damper frame and blades and showing the assembly of a movable, clearance maintaining member on the left side of one damper blade together with the arrangement of the shaft which supports the blade.

In the following description and in the drawing, like reference characters refer to like elements or features among the various figures of the drawing.

Referring to the drawing, the overall damper assembly is referred to generally by reference numeral 10. Damper assembly 10 has a rectangular frame 12 defining rectangular opening 14 providing a main passageway through the damper assembly. Main passageway 14 is coextensive with passageway 15 of a main gas carrying duct 16 (FIG. 8).

In the illustrated embodiment, damper assembly 10 includes three rectangular damper blades or closures 18, 20 and 22 mounted on parallel pivot axes, the axes being disposed in a single vertical plane. The pivot axis of damper blade 18 is provided by oppositely disposed, aligned shafts 28 and 29, mounted in frame 12 and extending partially into the blade as shown in FIG. 1. Likewise, the pivot axis of damper blade 20 is provided by oppositely disposed aligned shafts 30 and 31, and the pivot axis of damper blade 22 is provided by oppositely disposed aligned stub shafts 32 and 33.

Damper blade 18 includes a pair of spaced, flat, rectangular, parallel plates or walls 38, 39 disposed on either side of the blade axis (see particularly FIG. 2). Although the damper assembly shown is capable of controlling the flow of gases in the duct in either direction, plate 38 will, for descriptive purposes, be referred to as the upstream plate and plate 39 as the downstream plate.

Upstream plate 38 includes oppositely disposed, parallel, longitudinal edges 40, 42 and downstream plate 39 includes corresponding edges 48 and 50. Edge 40 of upstream plate 38 and edge 48 of downstream plate 39 define a rectangular aperture 51 in damper blade 18. Likewise, edges 42 and 50 define a rectangular aperture 52 in blade 18, aperture 52 being disposed opposite aperture 51. The space between plates 38 and 39 of blade 18 provides a fluid passageway 54 through the blade. Apertures 51, 52 communicate with fluid passageway 54 and provide openings thereto. Plates 38 and 39 are held apart and reinforced by supporting members including a series of connecting pins 56 extending perpendicularly between plates 38 and 39 and by a pair of shaft retaining blocks 58 between plates 38 and 39 on opposite longitudinal sides thereof. Shafts 28 and 29 are fixedly pinned to blocks 58.

Damper blade 20 includes a pair of spaced, flat, rectangular, parallel plates or walls 62, 63. Plate 62 is referred to as the upstream plate and plate 63 as the downstream plate. Upstream plate 62 includes oppositely disposed, parallel, longitudinal edges 64, 66 and downstream plate 63 includes oppositely disposed parallel, longitudinal edges 72, 74. Edge 64 of upstream plate 62 and edge 72 of downstream plate 63 define a rectangular aperture 75 in damper blade 20. Likewise, edges 66 and 74 define a rectangular aperture 76 in blade 20, aperture 76 being disposed opposite aperture 75. The space between plates 62, 63 of blade 20 provides a fluid passageway 78 through the blade. Apertures 75, 76 communicate with fluid passageway 78 and provide openings thereto. Plates 62, 63 are held apart and reinforced by a series of connecting pins 80 extending perpendicularly between plates 62, 63 and by a pair of shaft retaining blocks 82 between plates 62, 63 on opposite longitudinal sides thereof. Shafts 30, 31 are fixedly pinned to blocks 82.

Likewise, damper blade 22 includes a pair of spaced, flat, rectangular parallel plates or walls 86, 87. Plate 86 is referred to as the upstream plate and plate 87 is referred to as the downstream plate. Upstream plate 86 includes oppositely disposed, parallel, longitudinal edges 88, 90 and downstream plate 87 includes oppositely disposed, parallel, longitudinal edges 96, 97. Edge 88 of upstream plate 86 and edge 96 of downstream plate 87 define rectangular aperture 99 in damper blade 22. Similarly, edges 90 and 98 define an oppositely disposed rectangular aperture 100 in blade 22. The space between plates 86, 87 of blade 22 provides a fluid passageway 102 through the blade. Apertures 99, 100 communicate with fluid passageway 102 so that the passageway extends entirely through the blade from one end to the other. Plates 86, 87 of blade 22 are held apart and reinforced by a series of connecting pins 104 extending perpendicularly between the plates and by a pair of shaft retaining blocks 106 between the plates on opposite lateral sides thereof. Shafts 32, 33 are fixedly pinned to blocks 106.

The solid lines of FIGS. 2 and 7 show the individual damper blades 18, 20 and 22 in their closed positions and the overall damper assembly 10 in its closed condition. In such condition, the damper blades 18, 20 and 22 are aligned in edge-to-edge relationship to form a common barrier. Upstream plates 38, 62 and 86 are all aligned in one common plane which is perpendicular to the flow path. Likewise, downstream plates 39, 63 and 87 are aligned in another common plane spaced from and parallel to the upstream plane, i.e. the plane of plates 38, 62 and 86. These respective planes form a single enclosed sealing space 110 within the main fluid passageway 14 and extending thereacross but isolated therefrom. That is, the damper blades 18, 20 and 22, when in their closed positions, substantially block communication between their internal fluid passageways 54, 78 and 102, on the one hand, and the opening or main fluid passageway 14 of the damper, on the other hand. In this same closed position, fluid passageways 54, 78 and 102 are all in communicating alignment with each other. In this regard, aperture 52 of blade 18 mates with and is in registry with aperture 75 of blade 20. Aperture 76 of blade 20 mates with and is in registry with aperture 99 of blade 22. Aperture 51 of blade 18 and aperture 100 of blade 22 mate with frame 12.

The enclosed space 110 created by alignment of blades 18, 20 and 22 in the closed position is particularly advantageous in providing a gastight seal. It is well known in the art to seal a duct, such as a power plant flue duct, so as to prevent any leakage of flue gases downstream of the damper by providing a pair of closely spaced damper assemblies and introducing pressurized air between them, the pressure of the air exceeding the pressurehead of the flue gases. This ensures that the only leakage which can occur around the dampers is that of the pressurized air between the dampers. While a seal of this type is effective, the equipment for effecting the same has been expensive, particularly since two damper assemblies must be provided.

In the present arrangement, however, enclosed space 110 formed by the single damper assembly 10 of the present invention provides a region which may be pressurized with sealing air to ensure that no leakage of flue gases or the like can occur downstream of the single damper assembly. When enclosed space 110 is pressurized with sealing air, there will be a controlled air bleed about relatively movable mating regions of the frame and damper blades. in particular, the pressurized air may undergo a controlled bleeding or leakage on the upstream side between frame 14 and edge 40, between edges 42 and 64, between edges 66 and 88 and between edge 90 and frame 12. Likewise, on the downstream side there may be a controlled bleeding or leakage of air between frame 14 and edge 48, between edges 50 and 72, between edges 74 and 96, and between edge 98 and frame 12. Also, pressurized air in enclosed sealing space 110 may bleed past the clearance gaps between the lateral side edges of blades 18, 20 and 22 and the frame 12. Specifically, pressurized air may bleed around lateral side edges 112, 113 of blade 18, lateral side edges 115, 116 of blade 20 and lateral side edges 118, 119 of blade 22.

The pressurized air is supplied by a blower 122 which may be mounted on the damper frame 12 as shown in FIG. 3. A conduit 124 extends from blower 122 through an opening 125 in frame 12 into communication with closed space 110 via aperture 100 of damper blade 22. It will be apparent that this is accomplished by virtue of the registry of aperture 100 with opening 125.

Damper blades 18, 20 and 22 may be rotated from their closed positions shown by solid lines in FIGS. 2 and 7 to any desired partially open position to adjust the rate of fluid flow through the damper. A partially open position is shown in phantom lines in FIGS. 2 and 7. Further rotation of blades 18, 20 and 22 will bring them to the fully open position shown in FIG. 8.

To pivotally move the damper blades to control the flow through the damper assembly, a power operator 126 is provided. In the illustrated embodiment the power operator is a pneumatic or hydraulic cylinder. However, a manual operator may be suitable for some applications. Operator 126 is connected to shaft 32 by an operator arm 128. Upward movement of operator arm 128 causes shaft 32 to rotate in the clockwise direction as viewed in FIG. 2 to cause blade 22 to pivotally rotate clockwise toward the open position. By way of arms 130, 131 on shafts 32 and 28, respectively, and by way of linkage 133 interconnecting these arms, outer blades 18 and 22 rotate identically. Middle blade 20, on the other hand, is connected for delayed, reverse rotation in the embodiment shown in FIGS. 1, 2 and 8. In particular, the shaft 30 of middle damper blade 20 is operatively connected to the operator shaft 32 via arm 135 on shaft 32, arm 137 on shaft 30, and link 139 extending between arms 135 and 137. It is noted that the outer portions of shafts 30 and 32 are journaled in a support bracket 141 mounted on frame 14.

The positioning of arms 135 and 137 on their respective shafts is such that, while outer damper blades 18 and 22 undergo initial movement in direct relationship to the rotation of operator shaft 32, middle damper blade 20 initially remains substantially stationary. As rotation of shaft 32 continues, however, middle damper blade 20 will begin to rotate at an increasing rate until it reaches the fully open position along with outer damper blades 18, 22 as shown in FIG. 8. While outer damper blades 18, 22 rotate clockwise from the reference position of FIG. 2, middle damper blade 20 rotates in the opposite direction, namely, counterclockwise as viewed in FIG. 2. The delay in pivotal movement of middle damper blade 20 allows outer damper blades 18, 22 to move clear thereof to prevent interference. Also the manner of rotation of middle damper blade 20 helps achieve a desirable nearly flat curve in the relationship between flow rate and extent of operator movement.

FIG. 7 shows an alternate linkage arrangement wherein the damper blades 18, 20, 22 are moved by identically relatively disposed arms 143, 144, 145, respectively, the arms being connected by a straight link 147. With this linkage, damper blades 18, 20 and 22 move in unison in direct relationship with rotation of operator shaft 32. From the point of reference of FIG. 7, damper blades 18, 20 and 22 rotate clockwise when moving from the closed position toward the open position. Because the mating regions of the respective damper blades all move away from each other during the opening operation shown by phantom lines in FIG. 7, it is unnecessary to effect a delay in the opening of middle damper blade 20. While the linkage arrangement shown in FIG. 7 has advantages in terms of simplicity and ease of manufacturing, it provides a less nearly linear and thus less desirable relationship between operator movement and flow rate.

In the embodiments of both FIG. 2 and FIG. 7, the plates or walls of each damper blade are oppositely offset in staggered relationship with respect to the axis about which the damper blade pivots. This staggering prevents interference between the plates of different damper blades as they are swung into or out of the closed positions shown in solid lines in FIGS. 2 and 7. The staggering is best seen by reference to FIG. 4. The distance 148 between the plane of the pivot axis of damper blade 22 and edge 88 of upstream plate 86 is shorter than the distance 148 between the plane of the pivot axis of the same damper blade 22 and the edge 96 of the downstream plate 87 thereof. In other words, the "plate half" which extends over distance 148 and which terminates at edge 40 may be considered a "short" plate half, whereas the "plate half" extending over distance 149 and terminating at edge 96 may be considered a "long" plate half. Conversely, the distance 151 between the plane of the pivot axis of damper blade 22 and edge 90 of upstream plate 86 is longer than distance 153 between the plane of the pivot axis of damper blade 22 and edge 98 of downstream plate 87. Thus, the "plate half" corresponding to distance 151 and terminating at edge 90 is a "long" plate half, and the "plate half" corresponding to distance 153 and terminating at edge 98 is a "short" plate half.

As an example of the difference between the longer and shorter plate halves, one embodiment of the device of the invention has a center blade wherein the shorter plate halves are approximately 0.10 inches shorter than the longer plate halves, over a total plate height of approximately 23.83 inches. In the same embodiment, shorter plate halves of the outer two blades are approximately 0.15 inches shorter than the longer plate halves of the same outer blades over a distance of approximately 23.07 inches for the height of the plates.

In any given damper blade, 18, 20 or 22, each plate has a short half and a long half. Each short plate half on an upstream plate is disposed immediately opposite a long plate half on the downstream plate of the same blade, and vice versa. This provides the oppositely offset staggering described above.

Figure 4:
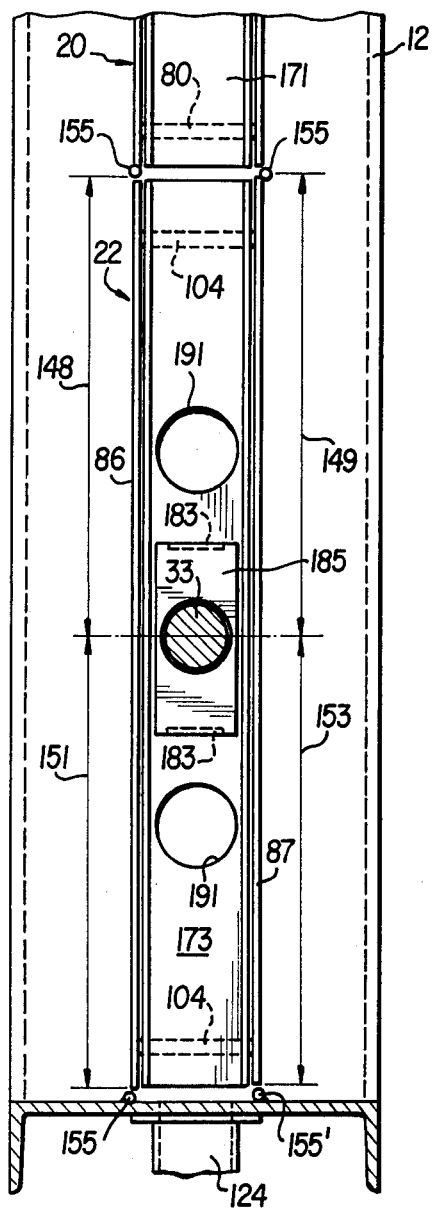
FIG. 4 is a fragmentary end elevational view, partly in section, of the movable member of FIG. 3 taken on the line 4—4 of FIG. 3.

The arrangement of long and short plate halves has been described in connection with lower damper blade 22 as shown in FIG. 4. It is noted that FIG. 4 reflects the damper blade arrangement and linkage shown in FIG. 2. With respect to the other blades of FIG. 2, the plate half of upper damper blade 18 terminating at edge 40 is a short plate half, that terminating at edge 42 a long plate half, that terminating at edge 48 a long plate half, and that terminating at edge 50 a short plate half. With respect to middle damper blade 20, the plate half terminating at edge 64 is a long plate half, that terminating at edge 66 is a short plate half, that terminating at edge 72 a short plate half, and that terminating at edge 74 a long plate half.

With respect to the embodiment of FIG. 7, the plate half of blade 20 terminating at edge 40 is a short plate half, that terminating at edge 42 a long plate half, that terminating at edge 48 a long plate half, that terminating in edge 50 a short plate half. In damper blade 20 arranged as per the embodiment of FIG. 7, the plate half terminating at edge 64 is a short plate half, that terminating at edge 66 a long plate half, that terminating at edge 72 a long plate half and that terminating at edge 74 a short plate half. With respect to damper blade 22 when arranged as per the embodiment of FIG. 7, the plate half terminating at edge 88 is a short plate half, that terminating at edge 90 a long plate half, that terminating at edge 96 a long plate half and that terminating at edge 98 a short plate half.

In both the embodiments of FIG. 2 and FIG. 7 the arrangement is such that only short plate halves of different damper blades will swing past each other during the opening and closing operations. This prevents interference between the plates of different blades. Each long plate half will always immediately move away from its mating plate on an adjacent blade or from its mating region on the frame during an opening operation and thus these blade halves can be longer.

Regardless of whether the damper blades are arranged and interconnected as per FIG. 2 or as per FIG. 7, they are swingable into the fully open position as shown generally in FIG. 8. Depending on which arrangement is used, however, different ends or apertures of the blades will face upstream and downstream. The reference characters applied to FIG. 8 correspond with the disposition of the blades of FIG. 2 when they have been swung into the fully open position. In that case, apertures 52, 75 and 100 face upstream and act as inlet openings to the fluid passageways 54, 78 and 102, respectively. Thus, apertures 51, 76 and 99 face downstream and act as outlet apertures.

When the blades arranged and interconnected as shown in FIG. 7 are moved into a fully open position similar to that shown in FIG. 8, then different sets of apertures act as inlet and outlet openings. Specifically, apertures 52, 76 and 100 would face upstream and act as inlet apertures, and apertures 51, 75 and 99 would face downstream and act as outlet apertures. As indicated earlier, the upstream and downstream directions have been arbitrarily selected for purposes of description, and the damper arrangements described may control fluid flows in either direction. If flow were to be in the opposite direction from that described, the above-described functioning of the apertures as inlet and outlet apertures would be reversed.

The fluid passageways 54, 78 and 102 of damper blades 18, 20 and 22, respectively, may be referred to as secondary fluid passageways when considered in connection with main fluid passageway or opening 14. It will be readily apparent from FIGS. 2, 7 and 8 that these secondary fluid passageways 54, 78 and 102 are exposed to communication with the opening or main fluid passageway 14 when damper blades 18, 20 and 22 are in positions other than their closed positions and that these passageways are then blocked from communication with the main fluid passageway 14 when the damper blades are in the closed position.

In the fully open position shown in FIG. 8, damper blades 18, 20 and 22 are all parallel to each other as are plates 38, 39, 62, 63, 86 and 87 thereof. These blades and plates are all disposed in side-by-side relationship and aligned with the direction of gas flow. As will be apparent from the drawing, the damper assembly 10, in general, and the plates 38, 39, 62, 63, 86 and 87, in particular, provide only a minimal resistance to flow when in the fully open, parallel position shown in FIG. 8 and in this regard the passageways 54, 78, and 102 and apertures 51, 52, 75, 76, 99, and 100 are substantially unrestricted. In this regard each of the plates is relatively very thin. In one embodiment for instance, the plates have a thickness of $\frac{1}{4}''$ for damper blades having a height of approximately 2 feet in a direction perpendicular to the axis of rotation and a length parallel to the axis of rotation of approximately 8 feet.

The use of parallel, spaced apart, thin plates with connecting pins extending between them is also advantageous in that relatively very small gauge, inexpensive materials may be used to provide a stiffer and stronger blade than could be provided with the same materials used in conventional constructions such as the air-foil blade construction shown in U.S. Pat. No. 3,525,328. Moreover, the multiple bi-planar blade construction as disclosed herein provides a much simpler and less expensive construction without sacrifices in damper performance. Relatively expensive fabrication operations are required to construct damper blades having an air-foil configuration as shown in U.S. Pat. No. 3,525,328, and such operations often result in warping of the blade edges and the need for expensive reworking.

By contrast, the construction disclosed herein only requires the joining together of flat plates which, of course, are a readily available stock item and which do not require forming or bending. Because forming and/or bending of the plates or the blades is not required, the warping problem will not arise.

Elongated clearance establishing members are located in the regions where damper blade edges 40, 42, 48, 50, 64, 66, 72, 74, 88, 90, 96 and 98 mate or cooperate with each other or with frame 12. Elongated members 155 are relatively rigid and preferably take the form of $\frac{1}{4}$ inch steel round stock welded to selected edges of the plates of damper blades 18, 20 and 22 or to frame 14. Each elongated member extends along either the entire length of the blade edge to which it is attached or the entire width of the frame member to which it is attached. Elongated members 155 provide a small, controlled clearance between the edges of the damper blades. They are capable of withstanding high temperatures such as are encountered in flue ducts.

In the manufacture of louver-type dampers, locating the mating edges or regions of the multiple damper blades can be a difficult problem. Small variations in the sizing of the frame, in the location of the blade axes, and in the sizing of the blades can result in significant discrepancies in the fit of mating regions of the blades and frame such as to adversely affect performance or such as to require reworking. The use of rigid metal sealing members welded to the blade edges and/or to the frame after assembly of the blades in the frame largely overcomes the foregoing difficulties, allows for more liberal manufacturing tolerances, and thus reduces cost.

When the damper blades 18, 20 and 22 have been assembled in the frame 12 and placed in the closed position, sealing members 155 are placed between the relatively movable mating regions, i.e. between edges 42 and 64, edges 66 and 88, edges 52 and 72, edges 74 and 96, and between frame 12 and outside edges 40, 48, 90 and 98. The elongated members 155 are positioned to primarily engage one of the relatively movable mating regions of each of the foregoing pairs thereof. A shim 157 (FIG. 9) is interposed between each elongated member 155 and the mating region next to the mating region which the elongated member primarily engages. The thickness of shim 157 is selected to correspond with the desired clearance between the mating regions. In FIG. 9 the thickness of the shim is exaggerated for purposes of illustration.

With shim 157 in place, each elongated member is affixed to the selected mating region of each pair, preferably by welding. Thereafter, the shim is removed to provide the desired clearance gap 159 (FIG. 10). It will be apparent that the precise, desired clearance between relatively movable mating regions will be provided regardless of variations in the spacing between the mating regions prior to attachment of elongated members 155. Use of round stock for the elongated members and use of shims 157 for positioning the elongated members as described has an added advantage in that the arcuate path of movement 161 (FIG. 11) of the adjacent cooperating blade edge (for example edge 64 of FIG. 11) is nearly coextensive with the tangent line 163 of elongated member 155 in the region where the edge would be apt to contact member 155. This condition helps avert the possibility of binding of the blades and/or damage thereto.

A preferred size or thickness for the clearance gap 159 is 0.020 inches at ambient temperature or room temperature when the damper is to be used in a flue duct. Such a clearance allows for thermal expansion of the damper blades when subjected to hot flue gases.

The particular element of each mating pair to which each elongated member 155 is attached is selected to reduce any possibility of interference between elements as the damper blades 18, 20 and 22 move into or away from their closed positions. In this regard, positioning the outermost elongated members 155 (i.e. those which cooperate with edges 40, 48, 90 and 98) on frame 12 rather than on the blade edges in the embodiments of both FIG. 2 and FIG. 7 ensures that the edges of the damper blades will not interfere with frame 12 during closing or opening. Because edge 40 of plate 38 and edge 98 of plate 87 define short plate halves as discussed above, the elongated members 155' affixed to frame 12 for cooperation with these two edges are of a larger diameter than the remaining elongated members 155. Specifically, a preferred diameter for elongated members 155' is ⅜ inch whereas the preferred diameter for the remaining elongated members is ¼ inch.

Those elongated members 155 which are disposed between the blade edges are also all located so as to minimize any possibility of interference. For reasons which will be apparent from the description of the manner of attaching the elongated members it is apparent that they will tend to be located toward the outside surfaces of the plates. The one edge of each mating pair of edges on which the elongated member is mounted is selected such that the other mating edge will not have to pass by the elongated member 155 during the final increments of movement into the closed positions or the initial increments of movement from the closed position.

For example, in the embodiment of FIG. 2, edge 50 of blade 18 moves away from edge 72 of blade 20 and from the associated elongated member 155 thereon ahead of the movement of edge 72 and associated elongated member 155 as the damper blades move out of the closed position toward the open position. This is due to the previously described delayed movement of damper blade 20. Thus, edge 50 will not have to pass over elongated member 155 of edge 72 when these elements are in close juxtaposition. Similar characteristics apply to the other mating edges of the embodiment of FIG. 2.

In FIG. 7 edge 42 of blade 18 immediately moves away from cooperating edge 72 of blade 20 during the initial increment of movement from the closed toward the open position. Thus, edge 72 and its associated elongated member 155 never passes over cooperating edge 42 in close juxtaposition thereto. Again, similar characteristics hold true for all of the other pairs of mating edges in the damper assembly of FIG. 7.

The damper assembly of the present invention also includes means for maintaining a predetermined clearance between the frame 12 and the lateral side edges 112, 113, 115, 116, 118, and 119 of blades 18, 20 and 22. Specifically, damper blade 18 includes a movable member 169 (see FIG. 1) disposed between upstream and downstream plates 38, 39 adjacent lateral side edge 113. Likewise, damper blade 20 includes a movable member 171 disposed between upstream and downstream plates 62, 63 adjacent lateral side edge 116. Damper blade 22 includes a movable member 173 disposed between upstream and downstream plates 86, 87 and adjacent lateral side edge 119. Because the movable members 169, 171 and 173 and their cooperation with the damper blades and frame are all alike, details of only one will be described.

Figure 5:
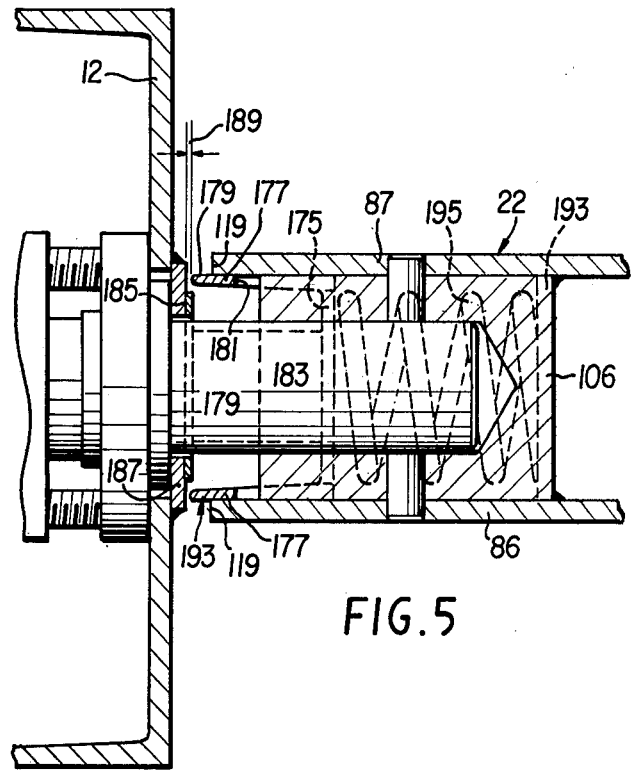
FIG. 5 is an enlarged, fragmentary, horizontal sectional view taken on the line 5—5 of FIG. 3.

Referring to FIG. 4 movable member 173 of blade 22 includes an outwardly facing channel member having a web 175 disposed perpendicularly to the upstream and downstream plates 86, 87 of blade 22 and having a pair of side flanges 177 (which are best seen by reference to FIG. 5) which are generally parallel to and contiguous with plates 86, 87. Each side flange has an outer free extremity 179 running substantially the entire length of lateral side edge 119 of blade 22. A cutout region 181 in web 175 accommodates shaft retaining block 106. A spacer member 183 is affixed to web 175 and surrounds cutout region 181. Spacer member 183 includes an outer bearing surface 185 which is disposed outside and beyond the outer extremity 179 by an amount corresponding to the desired clearance gap. Preferably, the clearance gap will be 0.030 inches.

Bearing surface 185 abuttingly engages a wear plate 187 which is part of damper frame 12 to maintain the 0.030 inch clearance gap 189 between the outer free extremity 179 and damper frame 12. Clearance gap 189 provides a controlled, minimal air bleed in the region of side edge 119 to effect sealing of the damper as described previously. Also, gap 189 ensures that the damper blades will not bind on the frame. As best seen in FIG. 4, web 175 of movable member 173 has a pair of openings 191 therein to facilitate the flow of pressurized sealing air from the space or fluid passageway 102 between plates 86, 87 and into the region of lateral side edges 119.

As also best seen in FIG. 4, a pair of spring retainers 193 are mounted in space 102 between plates 86, 87. Compressible coil springs 195 extend between retainers 193 and web 175 of movable member 173. Springs 195 urge bearing surface 185 against wear plate 187 to maintain clearance gap 189. This provides a floating arrangement between movable member 173 and blade 22. Heating of blade 22 under the influence of hot conduit gases will cause it to expand. Movable member 173 accommodates this expansion by being relatively movable with respect to blade 22. That is, as the blade 22 expands, coil springs 195 are compressed to accommodate this expansion. At the same time, however, movable member 173 maintains its same relative position with respect to the frame 12. That is, the 0.030 clearance gap is maintained during all stages of expansion of blade 22.

The use of spaced, flat parallel plates to form damper blades 18, 20 and 22 provides blades which are particularly suitable for carrying floating, movable clearance maintaining members 169, 171, 173. The construction provides open areas of generally rectangular cross section in the regions of the lateral side edges of the blades and allows for construction of the movable members with readily available materials requiring very little additional fabrication. In this regard each movable member 169, 171, 173 mainly consists of a standard steel channel piece.

Closely controlling the clearances between and around damper blades 18, 20 and 22 through the use of elongated members 155 and movable members 169, 171 and 173 ensures that the sealing air in enclosed sealing space 110 can be maintained at an adequate pressure (above the pressurehead of the duct gases) even with use of a relatively small and relatively inexpensive blower 122.

Figure 6:
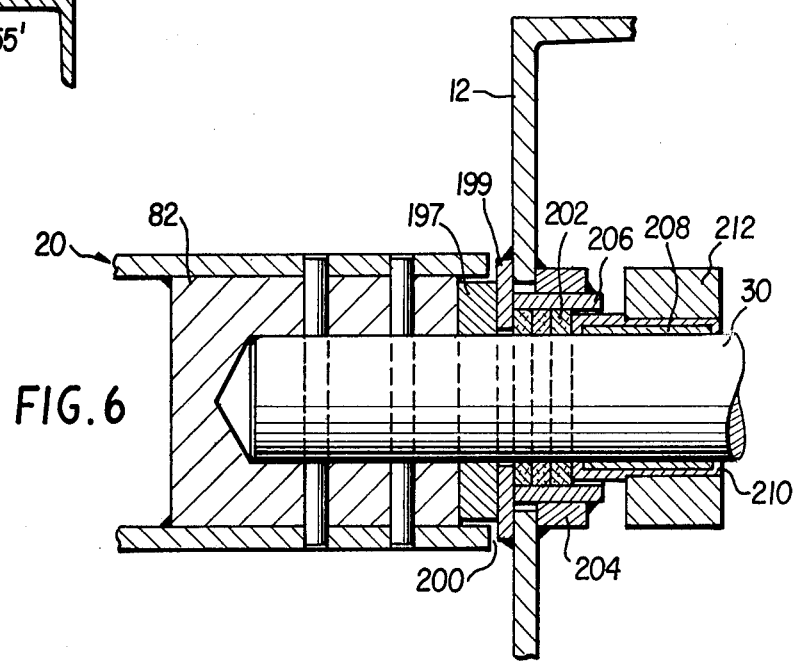
FIG. 6 is an enlarged, fragmentary horizontal sectional view, taken on the line 6—6 of FIG. 1 and showing the arrangement of a blade supporting shaft on the right side of one of the damper blades.

FIG. 6 shows in detail how shaft 30 is journaled in frame 12. These details apply generally to the other shafts which support the damper blades except to the extent that the construction of one side of each blade is varied to accommodate the movable member described above. The construction on the side opposite the movable member will now be described with reference to FIG. 6.

A spacer 197 is disposed between shaft retaining block 82 and a wear plate 199 affixed to the interior of frame 12. Spacer 197 bears against wear plate 199 to maintain a predetermined clearance gap 200. Thermal expansion of blade 20 will be accommodated by the previously described structure at the opposite end of the blade and will not affect clearance gap 200. Shaft 30 is sealed against leakage between the interior and exterior of the damper frame by packing 202 which is held in place by a spacer 204 and gland plate 206 welded to frame 12. Shaft 30 is supported by a bearing 208 retained by a bearing holder 210. The assembly of the packing 202, bearing 208, and bearing holder 210 is held in place by a follower plate 212 which is bolted to gland plate 206 (See FIG. 1).

It will be understood that while terms such as "upper", "lower", "right", "left", "upstream", and "downstream" have been used in the foregoing description, these terms are meant to illustrate relative relationships only and are not terms of limitation. It will also be understood that, while the invention has been described and illustrated by way of particular preferred embodiments, many modifications, variations and other uses of the invention may be made without departing from the spirit and scope thereof.

What is claimed is:

1. A damper assembly for controlling the flow of gases in a conduit, the assembly comprising, in combination, a plurality of generally rectangular blades, each including a pair of spaced, generally rectangular plates, each pair of plates defining a substantially unrestricted open flow passageway extending entirely through each blade, each blade having a pivot axis extending longitudinally thereof, the pivot axes of said plurality of blades supporting said blades and allowing said blades to swing about their respective axes into a closed condition wherein a first series of said plates are aligned in one common plane and wherein a second series of plates are aligned in a second common plane, said first and second series of plates forming an enclosed sealing space, said plurality of blades also being swingable into an open position wherein said plates of each blade are all substantially parallel to the plates of the other blades in side-by-side relationship and aligned with the direction of gas flow, whereby gas may flow between said blades and also between said plates of said blades through said open passageways defined thereby.

2. A damper as defined in claim 1, including means for admitting sealing fluid into said sealing space, said admitting means including an aperture defined by the spaced parallel plates of at least one of said blades.

3. A damper for a duct comprising a frame defining a rectangular opening and mountable in said duct and at least two blades extending across said opening and journaled in said frame to rotate about parallel axes from edge-to-edge closed positions forming a common barrier across said opening to open positions in parallel planes, each blade including a pair of spaced, flat parallel plates joined together with connecting members, the space between the plates of each blade defining a substantially unrestricted open fluid passageway through such blade.

4. A damper as defined in claim 3, wherein each plate of each blade includes a pair of edges extending parallel to the axis of rotation of each blade, one edge of one plate and one edge of the other plate defining a first open aperture of each blade, the other edge of said one plate and the other edge of said other plate defining a second open aperture, one of said apertures providing an inlet and the other of said apertures providing an outlet to said fluid passageway of each blade to permit flow of fluid therethrough.

5. A damper as defined in claim 4, wherein each blade includes sides parallel to said edges of said plates and in face-to-face relationship with said frame, and wherein the damper assembly includes means for maintaining a predetermined clearance between said sides and said frame, said maintaining means including a movable member disposed on one of said sides of each blade and between said plates thereof, a bearing between said frame and said movable member and biasing means urging said movable member toward said frame, said movable member having an outer extremity disposed adjacent said frame, said bearing being so disposed with respect to said movable member and said frame as to provide the predetermined clearance between said outer extremity and said frame, said biasing means allowing said moving means to move with respect to said blade upon thermal expansion to maintain said predetermined clearance.

6. A damper as defined in claim 3, including means for admitting sealing fluid into said space between the plates of each blade, said admitting means including an opening in said frame and an aperture defined by the spaced plates of at least one of said blades, said blade aperture and said frame opening being in registry with each other when said blades are in their closed positions.

7. An apparatus for controlling the flow of a fluid comprising:
(a) a housing having an opening therethrough defining a main fluid passageway;
(b) a plurality of closure members movably mounted in said housing and cooperating with said housing and with each other to control the flow of fluid through said main fluid passageway, each closure member including a pair of spaced walls, each pair of spaced walls defining a substantially unrestricted secondary fluid passageway through the interior of each of said closure members;
(c) said closure members being movable between open and closed positions;
(d) said closure members being so arranged that each secondary fluid passageway is exposed to communication with said main fluid passageway when said closure members are in a position other than said closed position, said closure members also being so arranged as to substantially block communication between said secondary fluid passageways and said main fluid passageway when said members are in the closed position.

8. An apparatus for controlling the flow of a fluid as defined in claim 7 wherein said closure members are so arranged that said fluid passageways thereof are all in communicating alignment with each other when said closure members are in the closed position to provide an enclosed sealing space extending across said main fluid passageway.

9. A damper as defined in claim 8, including means for admitting sealing fluid into said enclosed sealing space, each closure member including a pair of apertures providing inlets and outlets for said secondary fluid passageway of each blade, said admitting means including at least one of said apertures of at least one of said closure members.

10. An apparatus for controlling the flow of a fluid as defined in claim 9, wherein said enclosed space is connected by said admitting means with a source of pressurized fluid other than the fluid in said main fluid passageway to seal said closure members and prevent leakage of fluid in said main fluid passageway through said closure members.

11. An apparatus for controlling the flow of a fluid as defined in claim 10, wherein said source of pressurized fluid is an air blower.

12. A damper assembly comprising, in combination, a frame defining an opening, a series of damper blades each with a hollow interior, said damper blades being pivotally supported on said frame to swing between open and closed positions, said blades having oppositely disposed, open edge portions extending across said opening, said edge portions of each blade communicating with said hollow interior thereof to provide a substantially unrestricted open passageway through the blade.

13. A damper as defined in claim 12, wherein certain of said open edge portions mate with each other and with said frame when said damper blades are in the closed position to form an enclosed sealing space across said frame.

14. A damper as defined in claim 13, including means for admitting sealing fluid into said enclosure sealing space, each closure member having apertures defined by said edge portions, said admitting means including at least one of said apertures of at least one of said blades and an opening in said frame, said one aperture being in registry with said frame opening when said blades are in their closed positions.

15. A damper assembly comprising a series of damper blades which are pivotable about parallel axes between an open condition wherein the blades are in parallel, spaced, side-by-side relationship and a closed condition wherein said blades are aligned in edge-to-edge relationship to form a common barrier, each blade including an upstream wall and a downstream wall spaced from said upstream wall, said upstream wall having a first upstream wall edge and a second upstream wall edge, said downstream wall having a first downstream wall edge and a second downstream wall edge, said first upstream and downstream wall edges defining a substantially unrestricted open inlet in each blade, said second upstream and downstream wall edges defining a substantially unrestricted open outlet aperture in each blade, said inlet and outlet apertures communicating with each other to provide a substantially unrestricted open passageway through each blade, at least one of said apertures of one blade mating with one of said apertures of another blade to form a single enclosed sealing space between said walls of said series of blades when said blades are in the closed condition.

16. A damper as defined in claim 15, including means for admitting sealing fluid into said sealing space, said admitting means including one of said apertures.

17. A damper as defined in claim 15, wherein one upstream wall edge of each blade mates with one upstream wall edge of the next adjacent blade.

18. A damper as defined in claim 17, wherein one wall edge of each mating pair of wall edges includes a rigid sealing member fixedly attached thereto, said rigid sealing member providing a predetermined clearance between said mating wall edges at ambient temperature.

19. A damper as defined in claim 15, wherein said walls of each blade are oppositely offset in staggered relationship with respect to the axis about which the blade pivots, one of said upstream wall edges of each blade being disposed at a greater distance from the axis than the other of said upstream wall edges, one of said downstream wall edges of each blade being disposed at a greater distance from the axis than the other of said downstream wall edges.

* * * * *